Jan. 16, 1962 V. K. ARTHUR 3,016,611
ELLIPSE COMPASS
Filed Aug. 15, 1960 2 Sheets-Sheet 1
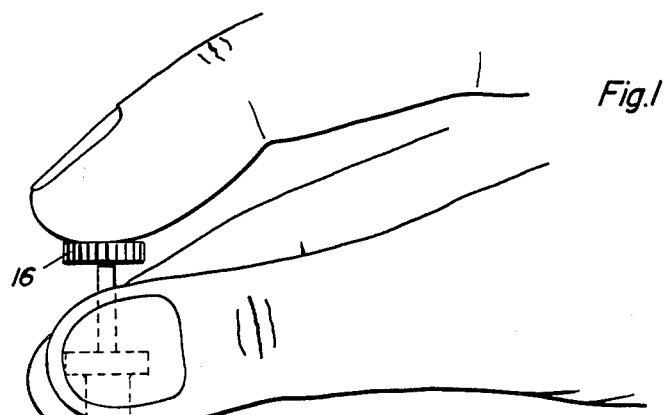
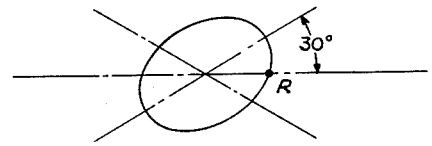
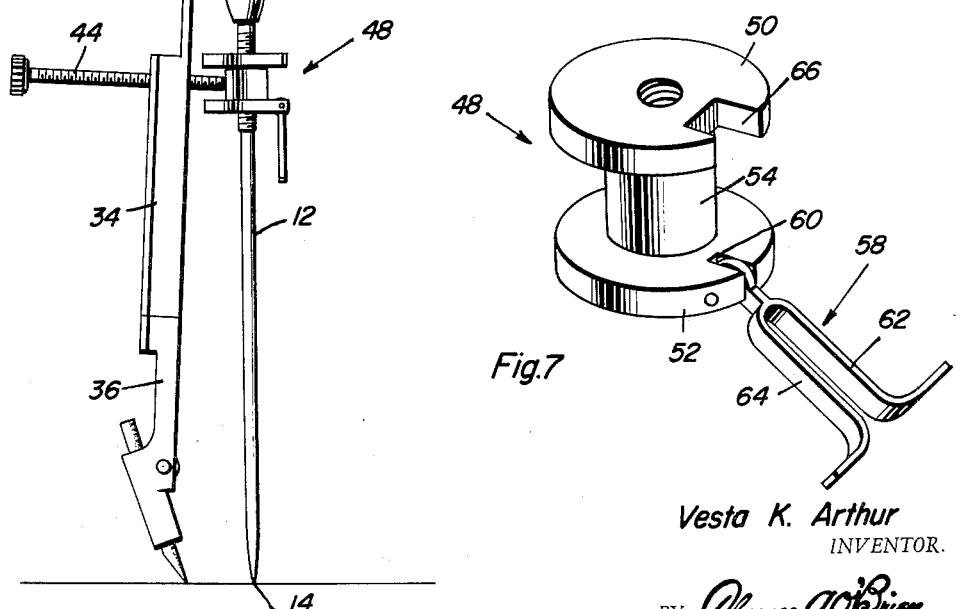
Vesta K. Arthur
INVENTOR.

Jan. 16, 1962 V. K. ARTHUR 3,016,611
ELLIPSE COMPASS
Filed Aug. 15, 1960 2 Sheets-Sheet 2
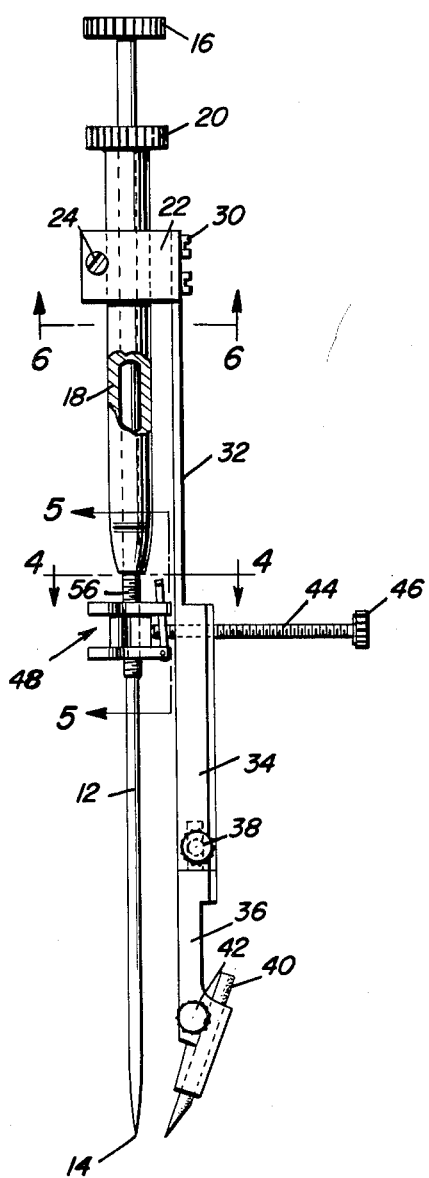
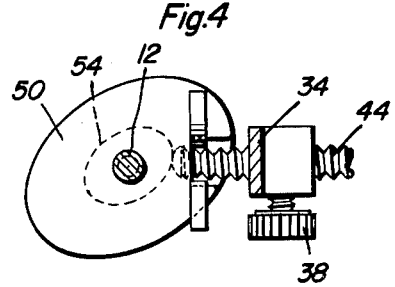
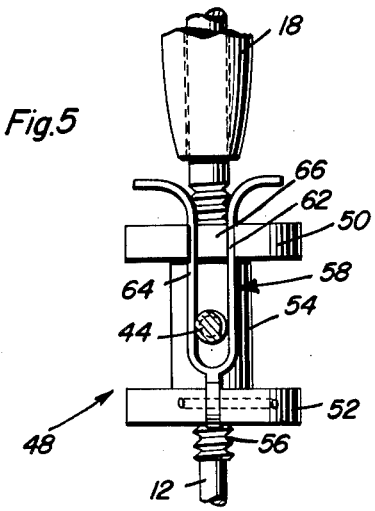
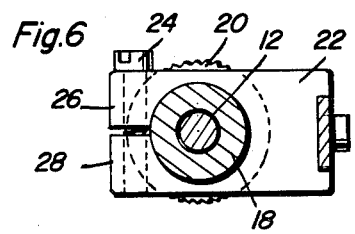
Vesta K. Arthur
INVENTOR.

United States Patent Office 3,016,611
Patented Jan. 16, 1962

3,016,611
ELLIPSE COMPASS
Vesta K. Arthur, 2563 Belgrave Ave.,
Huntington Park, Calif.
Filed Aug. 15, 1960, Ser. No. 49,764
4 Claims. (Cl. 33—30)

This invention relates to compass instruments especially designed for drawing non-circular figures such as an ellipse.

It is therefore a primary object of this invention to provide a compass instrument by means of which an ellipse or other non-circular configuration may be drawn corresponding to any desired radius from the center of the configuration or ellipse to a reference point thereon.

The instrument is accordingly particularly useful in connection with isometric drawings wherein a circle is depicted by an ellipse which ellipse has a point thereon which is at a distance from the center of the ellipse corresponding to the true radius of the circle which it represents. It is therefore an object of this invention to enable the draftsman to draw such an ellipse on isometric drawings by one complete sweep of the compass instrument made in accordance with this invention.

The compass instrument made in accordance with this invention therefore on outward appearance is very similar to the conventional type of bow compass but significantly differs therefrom in that the center pin has mounted thereon and rotatably fast therewith an elliptical cam element with which the adjustable radius screw is in engagement for varying the distance of the pencil holder from the center pin against the bias of the bowing spring by means of which the pencil holder is rotatably mounted on the center pin. Accordingly, the ellipse may be drawn by rotation of the pencil holder about the center pin with the radius screw riding the cam surface to continuously vary the radius relative to the axis of the center pin for drawing the ellipse. It will, however, be appreciated that the radius screw must be adjusted so as to correspond to the radius of the true circle which the ellipse is to represent. Therefore, the locking clip is pivotally connected to the cam element in alignment with the reference point thereon so that the radius screw may be locked to the cam element at said reference point whereupon the radius screw is extensibly adjusted to the desired radial distance. The locking clip is subsequently released so that the pencil holder with the radius screw may be rotated about the center pin with the radius screw riding on the cam element surface.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the ellipse compass instrument being used for drawing the ellipse.

FIGURE 2 illustrates the ellipse drawn by the ellipse compass.

FIGURE 3 is a side elevational view with parts shown in section of the ellipse compass instrument in its locked condition.

FIGURE 4 is a sectional view taken through a plane indicated by section line 4—4 in FIGURE 3.

FIGURE 5 is a sectional view taken through a plane indicated by section line 5—5 in FIGURE 3.

FIGURE 6 is a sectional view taken through a plane indicated by section line 6—6 in FIGURE 3.

FIGURE 7 is a prespective view of the cam element and lock mechanism.

Referring to the drawings in detail, the compass instrument made in accordance with this invention is generally indicated by reference numeral 10. It will therefore be observed that the compass instrument includes a center pin 12 having a center point 14 at its lower end which is placed on the geometric center of the configuration to be drawn by the instrument. The upper end of the center pin 12 has a knurled knob 16 connected thereto by means of which the center pin 12 may be held anchored at the center point.

A tubular element 18 is rotatably mounted on the center pin 12 for rotational movement thereof about the axis of the center pin. The tubular element therefore also includes a knurled knob 20 connected to the upper end thereof beneath the center pin knurled knob 16 so that the tubular element 18 may be rotated relative to the center pin as for example by means of the thumb and middle finger as the index finger anchors the center pin 12 by engagement with the knurled knob 16 as illustrated in FIGURE 1. Accordingly, the tubular element 18 has connected thereto a block member 22 for rotation with the tubular element 18. As more clearly seen in FIGURE 6, the block member 22 is frictionally held in engagement with the tubular member 18 by means of the friction adjustment screw 24 which draws together the split ends 26 and 28 of the block member 22.

It will also be observed that the block member 22 has connected thereto by means of fasteners 30 the bow spring member 32 which is connected to a mounting member 34, said bow spring member 32 thereby biasing the mounting member towards the center pin 12 to the position illustrated in FIGURE 3. A pencil holder member 36 is therefore mounted in the usual manner at the lower end of the mounting member 34. The pencil holder member 36 is accordingly releasably mounted by means of the setscrew 38 and also adjustably holds the pencil lead 40 by means of the adjustable setscrew 42 as seen in FIGURE 3. It will of course be appreciated that the pencil holder element 36 may be replaced by an inking element if so desired as will be apparent to anyone skilled in the art.

It will also be observed that the mounting member 34 has threadedly mounted therein the adjustable radius screw member 44 which includes a knurled knob end 46 by means of which the screw member 44 may be rotated so as to axially move it through the mounting member 34 toward or away from the axis of the center pin 12.

The radius screw member 44 is therefore in engagement with the cam element generally indicated by reference numeral 48. As more clearly seen in FIGURES 4, 5, and 7, the cam elements 48 include an upper flange 50 vertically spaced from a lower flange 52, said flanges being interconnected by a radial type cam 54. As more clearly seen in FIGURE 4, the cam 54 is elliptical in shape so that as the radius screw member 44 is drawn around the center pin 12 its motion will be confined by the elliptical cam surface to thereby move the pencil holder and pencil element 40 in the elliptical path desired. It should, however, be appreciated that cams of different shapes may be utilized if desired in order to draw figures of different curved shape. Accordingly, the cam element 48 may be replaced for such purpose by other similar cam elements wherein the cam portion 54 has a different cam surface than that illustrated in FIGURE 4. The cam element 48 is therefore mounted on the center pin 12 and held rotatably fast thereto by any suitable means as for example at the screw portion 56 on the center pin 12.

As hereinbefore indicated, in order to adjust the radius of the ellipse to be drawn by the instrument which ellipse will be geometrically similar to the elliptical cross-section of the cam portion 54 of the cam element 48, the radius screw 44 must be locked to the cam element 48 at a reference point on the cam surface 54 thereof. Accordingly, a lock mechanism is provided for such purpose which includes a clip member 58 which is pivotally connected to the bottom flange 52 within a pivot recess 60 formed therein as more clearly seen in FIGURE 7. The clip member 58 therefore includes a pair of parallel resilient arms 62 and 64 which would yieldably engage the sides of a locking recess 66 formed in the upper flange 50 for such purpose. The pivot recess 60 and locking recess 66 are therefore vertically aligned with a line on the cam surface 54 which contains the reference point hereinbefore referred to. Accordingly, when the clip member 58 is pivotally moved upwardly into the recess 66 as illustrated in FIGURES 3 and 5, it will straddle the radius screw member 44 and thereby lock the screw member to the cam element 48.

It will therefore be appreciated that when the screw member 44 is locked to the cam element it may be rotated in order to move the pencil holder 36 toward or away from the axis of the center pin 12 in order to obtain the desired true radius of the circle that the ellipse is to represent when the instrument is being used for isometric drawing purposes. Attention is therefore invited to FIGURE 2 wherein the true radius point is labeled by the letter R and is disposed at a 30° angle from the major axis of the ellipse which is geometrically similar to the cam surface 54 of the instrument. Accordingly, the illustrated cam element 48 is designed for 30° isometric drawing purposes. After the radius has been adjusted at the reference point as hereinbefore described, the locking clip 58 is released from the recess 66 to thereby release the radius screw 44 from the reference point on the cam element 48. The tubular element 18 with the pencil holder 36 is then rotated by means of the knurled knob 20 in order to draw the desired ellipse in one complete sweep.

From the foregoing description, operation and utility of the compass instrument will be apparent. It will also be appreciated that if the locking clip 58 is retained in locked position with the radius screw straddled therebetween, the compass may be used as any other compass for drawing circles. Accordingly, although this compass instrument is specially designed for a particular purpose the basic purpose for compasses, mainly to draw circles, is not destroyed. It will also be appreciated that the cam elements 48 are interchangeable for the purpose of using the instrument to draw ellipse circles of any desired angle as well as for the purpose of drawing other curvilinear configurations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A compass device comprising, center pin means, scribing means rotatably mounted on said center pin means and spring biased toward said center pin means, cam means mounted on said center pin means and rotatively fast therewith, adjustably extensible radius means operatively mounted on said scribing means for engagement with said cam means for variably spacing said scribing means relative to said center pin means against the spring bias on the scribing means and releasable lock means mounted on said cam means for locking said radius means thereto at a reference point on the cam mean enabling extensible adjustment of the radius means for drawing the desired curve by subsequent release of the lock means and rotation of the scribing means about said center pin means.

2. The device as defined in claim 1, wherein said cam means is elliptical in shape.

3. The device as defined in claim 2, wherein said cam means comprises vertically spaced flanges interconnected by a radial type cam element with which said radius means is engageable.

4. The device as defined in claim 3, wherein said lock means comprises a clip member pivotally connected to a lower flange of said vertically spaced flanges in vertical alignment with the reference point on said cam element, said clip member being pivotally movable into a recess formed in the other flange to thereby straddle said radius means for locking thereof to the cam means.

References Cited in the file of this patent

UNITED STATES PATENTS

| | | |
|---|---|---|
| 91,681 | Smith | June 22, 1869 |
| 249,049 | Howard | Nov. 1, 1881 |
| 1,406,863 | Hoffman | Feb. 14, 1922 |
| 1,716,782 | Larsen | June 11, 1929 |
| 1,734,613 | Corwin | Nov. 5, 1929 |
| 2,707,831 | Rial | May 10, 1955 |